(12) United States Patent
Rowlands et al.

(10) Patent No.: US 10,983,910 B2
(45) Date of Patent: Apr. 20, 2021

(54) BANDWIDTH WEIGHTING MECHANISM BASED NETWORK-ON-CHIP (NOC) CONFIGURATION

(71) Applicant: NetSpeed Systems, Inc., San Jose, CA (US)

(72) Inventors: Joseph Rowlands, San Jose, CA (US); Joji Philip, San Jose, CA (US)

(73) Assignee: NETSPEED SYSTEMS, INC., San Jose, CA (US)

( * ) Notice: Subject to any disclaimer, the term of this patent is extended or adjusted under 35 U.S.C. 154(b) by 43 days.

(21) Appl. No.: 16/258,440

(22) Filed: Jan. 25, 2019

(65) Prior Publication Data

US 2019/0258573 A1    Aug. 22, 2019

Related U.S. Application Data

(60) Provisional application No. 62/634,079, filed on Feb. 22, 2018.

(51) Int. Cl.
*G06F 12/0813* (2016.01)
*G06F 12/0811* (2016.01)
(Continued)

(52) U.S. Cl.
CPC ........ *G06F 12/0813* (2013.01); *G06F 9/3838* (2013.01); *G06F 12/0811* (2013.01);
(Continued)

(58) Field of Classification Search
None
See application file for complete search history.

(56) References Cited

U.S. PATENT DOCUMENTS 4,409,838 A   10/1983  Schomberg
4,933,933 A    6/1990  Dally et al.
(Continued)

FOREIGN PATENT DOCUMENTS

CN    103684961 A    3/2014
JP       5936793       5/2016
(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Jamaal Henson
(74) *Attorney, Agent, or Firm* — Spectrum IP Law Group LLC

(57) ABSTRACT

The present disclosure relates to a bandwidth weighting mechanism based NoC configuration/constructions for packet routing. In an aspect, the present disclosure relates to a method for packet routing in a circuit architecture, wherein the method includes the steps of managing, at a router of the circuit architecture, one or more catch-up bits, each of the one or more catch-up bits indicating that the router has reset a round of round-robin based packet routing without allowing an agent corresponding to the each of the one or more catch-up bits to complete its respective round; and allowing, by the router, the agent to continue its respective round in catch-up state such that upon completion of the respective round, the agent is switched to normal state.

12 Claims, 17 Drawing Sheets

(51) Int. Cl.
*H04L 12/725* (2013.01)
*H04L 12/773* (2013.01)
*G06F 9/38* (2018.01)
*H04L 12/713* (2013.01)

(52) U.S. Cl.
CPC ............ *H04L 45/302* (2013.01); *H04L 45/60* (2013.01); *H04L 45/586* (2013.01)

(56) References Cited

U.S. PATENT DOCUMENTS

| | | | |
|---|---|---|---|
| 5,105,424 A | 4/1992 | Flaig et al. | |
| 5,163,016 A | 11/1992 | Har'El et al. | |
| 5,355,455 A | 10/1994 | Hilgendorf et al. | |
| 5,432,785 A | 7/1995 | Ahmed et al. | |
| 5,563,003 A | 10/1996 | Suzuki et al. | |
| 5,583,990 A | 12/1996 | Birrittella et al. | |
| 5,588,152 A | 12/1996 | Dapp et al. | |
| 5,764,740 A | 6/1998 | Holender | |
| 5,790,554 A | 8/1998 | Pitcher et al. | |
| 5,859,981 A | 1/1999 | Levin et al. | |
| 5,991,308 A | 11/1999 | Fuhrmann et al. | |
| 5,999,530 A | 12/1999 | LeMaire et al. | |
| 6,003,029 A | 12/1999 | Agrawal et al. | |
| 6,029,220 A | 2/2000 | Iwamura et al. | |
| 6,058,385 A | 5/2000 | Koza et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |
| 6,377,543 B1 | 4/2002 | Grover et al. | |
| 6,415,282 B1 | 7/2002 | Mukherjea et al. | |
| 6,674,720 B1 | 1/2004 | Passint et al. | |
| 6,701,361 B1 | 3/2004 | Meier | |
| 6,711,717 B2 | 3/2004 | Nystrom et al. | |
| 6,778,531 B1 | 8/2004 | Kodialam et al. | |
| 6,925,627 B1 | 8/2005 | Longway et al. | |
| 6,967,926 B1 | 11/2005 | Williams, Jr. et al. | |
| 6,983,461 B2 | 1/2006 | Hutchison et al. | |
| 7,046,633 B2 | 5/2006 | Carvey | |
| 7,065,730 B2 | 6/2006 | Alpert et al. | |
| 7,143,221 B2 | 11/2006 | Bruce et al. | |
| 7,318,214 B1 | 1/2008 | Prasad et al. | |
| 7,379,424 B1 | 5/2008 | Krueger | |
| 7,437,518 B2 | 10/2008 | Tsien | |
| 7,461,236 B1 | 12/2008 | Wentzlaff | |
| 7,509,619 B1 | 3/2009 | Miller et al. | |
| 7,564,865 B2 * | 7/2009 | Radulescu | H04L 45/00 370/458 |
| 7,583,602 B2 | 9/2009 | Bejerano et al. | |
| 7,590,959 B2 | 9/2009 | Tanaka | |
| 7,693,064 B2 | 4/2010 | Thubert et al. | |
| 7,701,252 B1 | 4/2010 | Chow et al. | |
| 7,724,735 B2 | 5/2010 | Locatelli et al. | |
| 7,725,859 B1 | 5/2010 | Lenahan et al. | |
| 7,774,783 B2 | 8/2010 | Toader | |
| 7,808,968 B1 | 10/2010 | Kalmanek, Jr. et al. | |
| 7,853,774 B1 | 12/2010 | Wentzlaff | |
| 7,917,885 B2 | 3/2011 | Becker | |
| 7,957,381 B2 | 6/2011 | Clermidy et al. | |
| 7,973,804 B2 | 7/2011 | Mejdrich et al. | |
| 8,018,249 B2 | 9/2011 | Koch et al. | |
| 8,020,163 B2 | 9/2011 | Nollet et al. | |
| 8,020,168 B2 | 9/2011 | Hoover et al. | |
| 8,050,256 B1 | 11/2011 | Bao et al. | |
| 8,059,551 B2 | 11/2011 | Milliken | |
| 8,086,800 B2 * | 12/2011 | Radulescu | G06F 13/4208 711/118 |
| 8,098,677 B1 | 1/2012 | Pleshek et al. | |
| 8,099,757 B2 | 1/2012 | Riedl et al. | |
| 8,136,071 B2 | 3/2012 | Solomon | |
| 8,203,938 B2 | 6/2012 | Gibbings | |
| 8,261,025 B2 | 9/2012 | Mejdrich et al. | |
| 8,281,297 B2 | 10/2012 | Dasu et al. | |
| 8,306,042 B1 | 11/2012 | Abts | |
| 8,312,402 B1 | 11/2012 | Okhmatovski et al. | |
| 8,352,774 B2 | 1/2013 | Elrabaa | |
| 8,407,425 B2 | 3/2013 | Gueron et al. | |
| 8,412,795 B2 | 4/2013 | Mangano et al. | |
| 8,438,578 B2 | 5/2013 | Hoover et al. | |
| 8,448,102 B2 | 5/2013 | Komachuk et al. | |
| 8,490,110 B2 | 7/2013 | Hoover et al. | |
| 8,492,886 B2 | 7/2013 | Or-Bach et al. | |
| 8,503,445 B2 | 8/2013 | Lo | |
| 8,514,889 B2 | 8/2013 | Jayasimha | |
| 8,541,819 B1 | 9/2013 | Or-Bach et al. | |
| 8,543,964 B2 | 9/2013 | Ge et al. | |
| 8,572,353 B1 | 10/2013 | Bratt et al. | |
| 8,601,423 B1 | 12/2013 | Philip et al. | |
| 8,614,955 B2 | 12/2013 | Gintis et al. | |
| 8,619,622 B2 | 12/2013 | Harrand et al. | |
| 8,635,577 B2 | 1/2014 | Kazda et al. | |
| 8,661,455 B2 | 2/2014 | Mejdrich et al. | |
| 8,667,439 B1 | 3/2014 | Kumar et al. | |
| 8,705,368 B1 * | 4/2014 | Abts | H04L 47/10 370/238 |
| 8,711,867 B2 | 4/2014 | Guo et al. | |
| 8,717,875 B2 | 5/2014 | Bejerano et al. | |
| 8,726,295 B2 | 5/2014 | Hoover et al. | |
| 8,738,860 B1 | 5/2014 | Griffin et al. | |
| 8,793,644 B2 | 7/2014 | Michel et al. | |
| 8,798,038 B2 | 8/2014 | Jayasimha et al. | |
| 8,819,611 B2 | 8/2014 | Philip et al. | |
| 8,885,510 B2 | 11/2014 | Kumar et al. | |
| 9,007,920 B2 * | 4/2015 | Kumar | H04L 5/0035 370/241 |
| 9,210,048 B1 | 12/2015 | Marr et al. | |
| 9,223,711 B2 | 12/2015 | Philip et al. | |
| 9,235,813 B1 | 1/2016 | Qian et al. | |
| 9,244,845 B2 | 1/2016 | Rowlands et al. | |
| 9,244,880 B2 | 1/2016 | Philip et al. | |
| 9,253,085 B2 | 2/2016 | Kumar et al. | |
| 9,294,354 B2 | 3/2016 | Kumar | |
| 9,319,232 B2 | 4/2016 | Kumar | |
| 9,444,702 B1 | 9/2016 | Raponi et al. | |
| 9,471,726 B2 | 10/2016 | Kumar et al. | |
| 9,473,359 B2 | 10/2016 | Kumar et al. | |
| 9,473,388 B2 | 10/2016 | Kumar et al. | |
| 9,473,415 B2 | 10/2016 | Kumar | |
| 9,477,280 B1 | 10/2016 | Gangwar et al. | |
| 9,529,400 B1 | 12/2016 | Kumar et al. | |
| 9,535,848 B2 | 1/2017 | Rowlands et al. | |
| 9,568,970 B1 | 2/2017 | Kaushal et al. | |
| 9,569,579 B1 | 2/2017 | Kumar | |
| 9,571,341 B1 | 2/2017 | Kumar et al. | |
| 9,571,402 B2 | 2/2017 | Kumar et al. | |
| 9,571,420 B2 | 2/2017 | Kumar | |
| 9,590,813 B1 | 3/2017 | Kumar et al. | |
| 9,660,942 B2 | 5/2017 | Kumar | |
| 9,699,079 B2 | 7/2017 | Chopra et al. | |
| 9,742,630 B2 | 8/2017 | Philip et al. | |
| 9,792,397 B1 | 10/2017 | Nagaraja | |
| 2002/0071392 A1 | 6/2002 | Grover et al. | |
| 2002/0073380 A1 | 6/2002 | Cooke et al. | |
| 2002/0083159 A1 | 6/2002 | Ward et al. | |
| 2002/0095430 A1 | 7/2002 | Egilsson et al. | |
| 2002/0150094 A1 | 10/2002 | Cheng et al. | |
| 2003/0005149 A1 | 1/2003 | Haas et al. | |
| 2003/0088602 A1 | 5/2003 | Dutta et al. | |
| 2003/0145314 A1 | 7/2003 | Nguyen et al. | |
| 2003/0200315 A1 | 10/2003 | Goldenberg et al. | |
| 2004/0006584 A1 | 1/2004 | Vandeweerd | |
| 2004/0019814 A1 | 1/2004 | Pappalardo et al. | |
| 2004/0049565 A1 | 3/2004 | Keller et al. | |
| 2004/0103218 A1 | 5/2004 | Blumrich et al. | |
| 2004/0156376 A1 | 8/2004 | Nakagawa | |
| 2004/0156383 A1 | 8/2004 | Nakagawa et al. | |
| 2004/0216072 A1 | 10/2004 | Alpert et al. | |
| 2005/0108711 A1 * | 5/2005 | Arnold | G06F 9/3009 718/100 |
| 2005/0147081 A1 | 7/2005 | Acharya et al. | |
| 2005/0203988 A1 | 9/2005 | Nollet et al. | |
| 2005/0228930 A1 | 10/2005 | Ning et al. | |
| 2005/0286543 A1 | 12/2005 | Coppola et al. | |

(56) References Cited

U.S. PATENT DOCUMENTS

| | | |
|---|---|---|
| 2006/0002303 A1 | 1/2006 | Bejerano et al. |
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0226407 A1* | 9/2007 | Radulescu .......... G06F 13/4208 711/110 |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1* | 8/2008 | Rijpkema ............... H04L 47/39 370/458 |
| 2008/0205432 A1* | 8/2008 | Gangwal ............... H04L 49/109 370/458 |
| 2008/0211538 A1 | 9/2008 | Lajolo et al. |
| 2008/0232387 A1* | 9/2008 | Rijpkema ............... H04L 45/00 370/420 |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1* | 1/2011 | Cidon ................ G06F 15/7825 710/107 |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |

(56) References Cited

U.S. PATENT DOCUMENTS

| | | |
|---|---|---|
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1* | 6/2013 | Mangano ............ H04L 47/52 370/468 |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Nooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1* | 5/2014 | Hutton ............ H04L 41/0893 370/360 |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0204764 A1* | 7/2014 | Kumar ............ H04L 5/0035 370/241 |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |
| 2018/0198687 A1 | 7/2018 | Rao et al. |
| 2019/0266088 A1 | 8/2019 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Kilo-NOC: A Heterogeneous Network-on-Chip Architecture for Scalability and Service Guarantees, ISCA 11, Jun. 4-8, 2011, 12 pgs.

(56) References Cited

OTHER PUBLICATIONS

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.
Hestness, J., et al., Netrace: Dependency-Tracking for Efficient Network-on-Chip Experimentation, The University of Texas at Austin, Dept. of Computer Science, May 2011, 20 pgs.
Jiang, N., et al., Performance Implications of Age-Based Allocations in On-Chip Networks, CVA MEMO 129, May 24, 2011, 21 pgs.
Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.
Lee, M. M., et al., Approximating Age-Based Arbitration in On-Chip Networks, PACT '10, Sep. 11-15, 2010, 2 pgs.
Li, B., et al., CoQoS: Coordinating QoS-Aware Shared Resources in NoC-based SoCs, J. Parallel Distrib. Comput., 71(5), May 2011, 14 pgs.
Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NOC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 14 2015, 5 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Sep. 8, 2016, 4 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 6 pages, untranslated, Japan Patent Office.
Boyan et al., Learning Evaluation Functions to Improve Optimization by Local Search, Journal of Machine Learning Research (2000) (Year:2000).
Das, R., et al., Aergia: Exploiting Packet Latency Slack in On-Chip Networks, 37th International Symposium on Computer Architecture {ISCA '10), Jun. 19-23, 2010, 11 pgs.
Decision to Grant for Japanese Patent Application No. 2016-516030 dated Nov. 22, 2016, 3 pages, Japan.
Grot, B., Preemptive Virtual Clock: A Flexible, Efficient, and Cost-Effective QOS Scheme for Networks-on-Chip, Micro '09, Dec. 12-16, 2009, 12 pgs.
Marculescu et al., "Outstanding Research Problems in Noc design: System, Microarchitecture, and Circuit Perspectives," IEEE Transactions on Computer-Aided Design of Integrated Circuits & Systems (Jan. 2009) (Year: 2009).
Matsutani et al., "Low-Latency Wireless 3D NoCs via Randomized Shortcut Chips" EDAA (2014) (Year: 2014).
Non-Final Office action dated Sep. 4, 2020 to U.S. Appl. No. 15/404,010.
Qian et al., "A Support Vector Regression (SVR)-Based Latency Model for Network-on-Chip (NoC) Architectures," IEEE 2016 (Year: 2016).
Zhou et al., "An Accurate Detailed Routing Routability Prediction Model in Placement," IEEE 2015 (Year: 2015).

\* cited by examiner (RELATED ART)

(RELATED ART)

BANDWIDTH WEIGHTING MECHANISM BASED NETWORK-ON-CHIP (NOC) CONFIGURATION

CROSS REFERENCE TO RELATED APPLICATION

This U.S. patent application is based on and claims the benefit of domestic priority under 35 U.S.C. 119(e) from provisional U.S. patent application No. 62/634,079, filed on Feb. 22, 2018, the disclosure of which is hereby incorporated by reference herein in its entirety.

TECHNICAL FIELD

Methods and example implementations described herein are generally directed to quality-of-service (QOS) enhancement pertaining to packet routing in Network-on-Chip (NoC) architectures, and more specifically, to implementation of a bandwidth weighting mechanism based NoC configuration/constructions for packet routing.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A, 2-D (two dimensional) mesh (as shown in FIG. 1B), and 2-D Taurus (as shown in FIG. 1C) are examples of topologies in the related art. Mesh and Taurus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits).

The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. The specification can include constraints such as Bandwidth/ Quality of Service (QoS)/latency attributes that are to be met by the NoC, and can be, in various software formats, depending on the design tools, utilized. Once NoC is generated through the use of design tools on the specification to meet specification requirements, physical architecture can be implemented either by manufacturing a chip layout to facilitate NoC or by generation of a register transfer level (RTL) for execution on a chip to emulate the generated NoC, depending on desired implementation. Specifications may be in common power format (CPF), Unified Power Format (UPF), or others according to the desired specification. Specifications can be in the form of traffic specifications indicating the traffic, bandwidth requirements, latency requirements, interconnections, etc depending on the desired implementation. Specifications can also be in the form of power specifications to define power domains, voltage domains, clock domains, and so on, depending on the desired implementation.

Specification can include parameters for bandwidth, traffic, jitter, dependency information, and attribute information depending on desired implementation. In addition to this, information such as position of various components, protocol information, clocking and power domains, etc. may be supplied. A NoC compiler can then use this specification to automatically design a NoC for the SoC. A number of NoC compilers were introduced in the related art that automatically synthesize a NoC to fit a traffic specification. In such design flows, synthesized NoC is simulated to evaluate performance under various operating conditions and to determine whether the specifications are met. This may be necessary because NoC-style interconnects are distributed systems and their dynamic performance characteristics under load are difficult to predict statically and can be very sensitive to a wide variety of parameters.

In related art implementations, one of the key design issues in a NoC is the allocation of bandwidth when resources are limited (e.g., memory bandwidth). QoS is a general description for chip decision making in terms of how such bandwidth is allocated. Typically, the QoS would include the ability to allocate a certain amount of bandwidth to each agent.

One approach in a distributed network is to use a series of arbitration points wherein weighted round robin is utilized at each arbitration point. Weighted round robin is implemented at each arbitration point as a programmed result that allocates a specific amount of bandwidth. Through such implementations, each arbiter can implement a weighted round robin with defined weights for each port. Such implementations allow for overall control of bandwidth allocation in the system by cascading the arbiters and having them programmed in a manner to maintain consistency. However, such implementations, including the specification of the weights utilized for the weighted round robin at each port, can be laborious and can also lead to unexpected bandwidth allocation when some agents are idle. For example, if agents do not use all of the bandwidth, the bandwidth can be distributed to other agents and the resulting allocation can be disproportionately outside of the ratios specified.

In related art implementations, there are existing packet routing mechanisms that tag certain packets as barriers, and rely on routers and bridges to switch between barrier mode (to stop/reduce/eliminate flow of packets tagged as barriers) and normal mode (to allow normal flow of packets across one or more NoC nodes) for processing requests. Such switching technique has various issues, including, but not limited to, generation of divergent paths that do not allow efficient working of current QoS (quality-of-service) as for optimal working, the traffic stream should not diverge as such divergence can make the barrier packet to go in one direction, leaving the other direction without a barrier, which creates unpredictable unfairness.

Another issue with current solutions involves premature switching of modes, wherein if a router or bridge is in normal or barrier but only has requests for the other mode, it will switch modes even if there are potentially more packets coming in the prior mode. This can happen because of bubbles (due to clock crossing or upsizing, for instance), or because of multiple-VCs (while one VC is in use, the others appear to have bubbles), or due to presence of divergent traffic (if packets go down different directions, each will appear to have bubbles). The cost of the premature switching is that packet streams halfway through a QoS round will get bumped to the next round, and will only receive the remainder of their round. Therefore, if a stream was going to send 10 packets, and managed only 5 before the premature switch, the next round will only receive 5.

Yet another issue with the existing solutions arises with VCs that have same priority and are not weighted together. Multiple VCs can be used for deadlock or to avoid head-of-line blocking. These VCs can still have the same priority, and therefore currently there is no way of allocating weight appropriately between these. For instance, two VCs send read traffic to a memory controller. One is used by one master, while the other is used by 10 masters. Using current solutions, arbitration is Round Robin, and therefore the single master will get 10 rounds of traffic for every 1 round from everyone else.

Therefore, there exists a need for methods, systems, and computer readable mediums for overcoming the above-mentioned issues with existing implementations of packet routing.

SUMMARY

Methods and example implementations described herein are generally directed to quality-of-service (QOS) enhancement pertaining to packet routing in Network-on-Chip (NoC) architectures, and more specifically, to implementation of a bandwidth weighting mechanism based NoC configuration/constructions for packet routing.

Aspects of the present disclosure relate to methods, systems, and computer readable mediums for packet routing in a circuit architecture, wherein, in an aspect, the proposed method includes the steps of managing, at a router of the circuit architecture, one or more catch-up bits, each of the one or more catch-up bits indicating that the router has reset a round of weighted round-robin based packet routing without allowing an agent corresponding to said each of the one or more catch-up bits to complete its respective round; and allowing, by the router, the agent to continue its respective round in catch-up state such that upon completion of said respective round, the agent is switched to normal state.

In an aspect, when an output port of the respective router transitions to a new round, a first set of agents that are in end-of-round state return to said normal state, and a second set of agent that are in normal state are switched to catch-up state. In another aspect, arbiter of the respective router allocates highest priority to agents that form part of the catch-up state. In yet another aspect, each output port of the respective router can be configured as a 2-bit state machine. In another aspect, in a new round, sources having remaining requests in the previous round will transmit the remaining requests of the previous round and the requests of the new round. Each of the sources individually manage their own rounds and delineates the end of the round through the transmission of the end of round signal.

In an aspect, the present disclosure further relates to a non-transitory computer readable medium storing instructions for executing a process for packet routing in a circuit architecture, the instructions comprising: managing, at a router of the circuit architecture, one or more catch-up bits, each of the one or more catch-up bits indicating that the router has reset a round of round-robin based packet routing without allowing an agent corresponding to the each of the one or more catch-up bits to complete its respective round; and allowing, by the router, the agent to continue its respective round in catch-up state such that upon completion of the respective round, the agent is switched to normal state.

In another aspect, the present disclosure relates to a system operatively coupled with a circuit architecture comprising: a catch-up bits management module configured to manage, at a router of the circuit architecture, one or more catch-up bits, said each of the one or more catch-up bits indicating that said router has reset a round of round-robin based packet routing without allowing an agent corresponding to said each of the one or more catch-up bits to complete its respective round; and a catch-up state based agent round execution module configured to allow, by said router, said agent to continue its respective round in catch-up state such that upon completion of said respective round, said agent is switched to normal state.

DETAILED DESCRIPTION

Figure 1A:
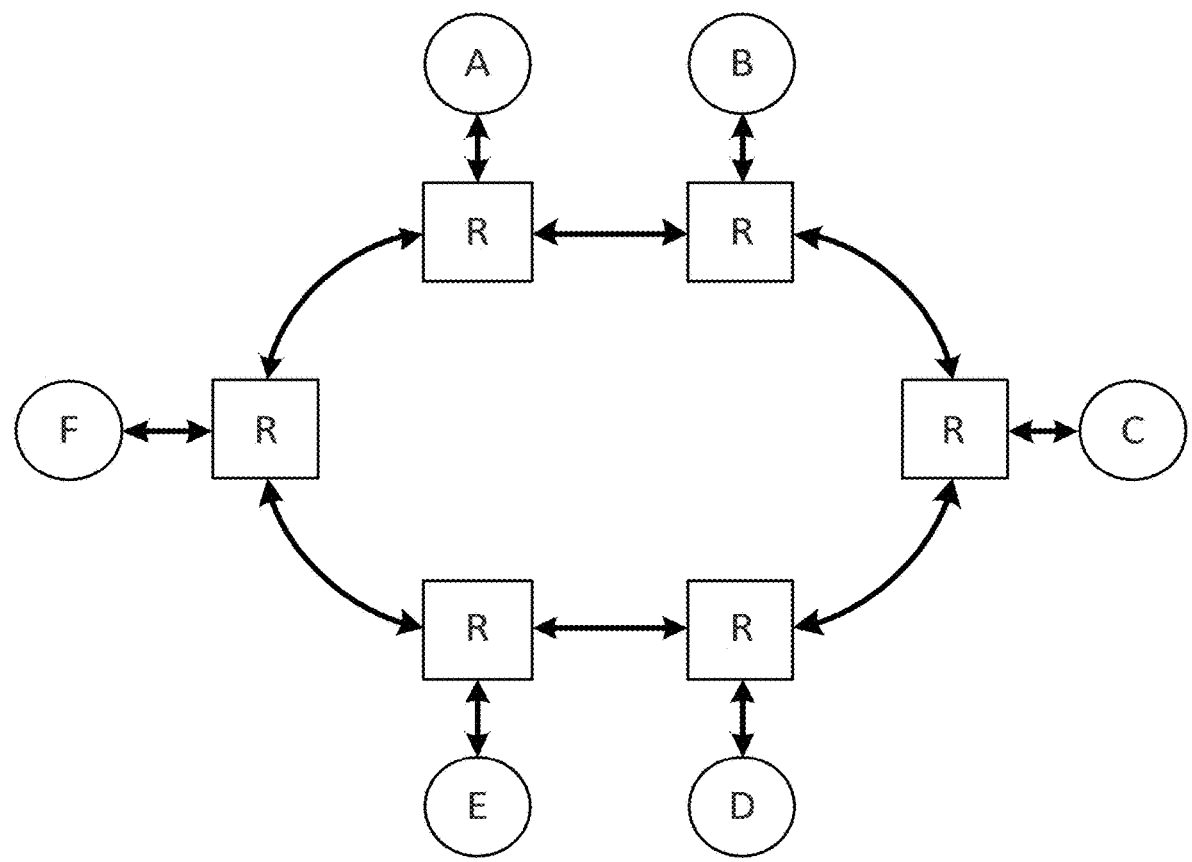
FIGS. 1A, 1B, 1C, and 1D illustrate examples of Bidirectional ring, 2D Mesh, 2D Taurus, and 3D Mesh NoC Topologies.
Figure 1B:
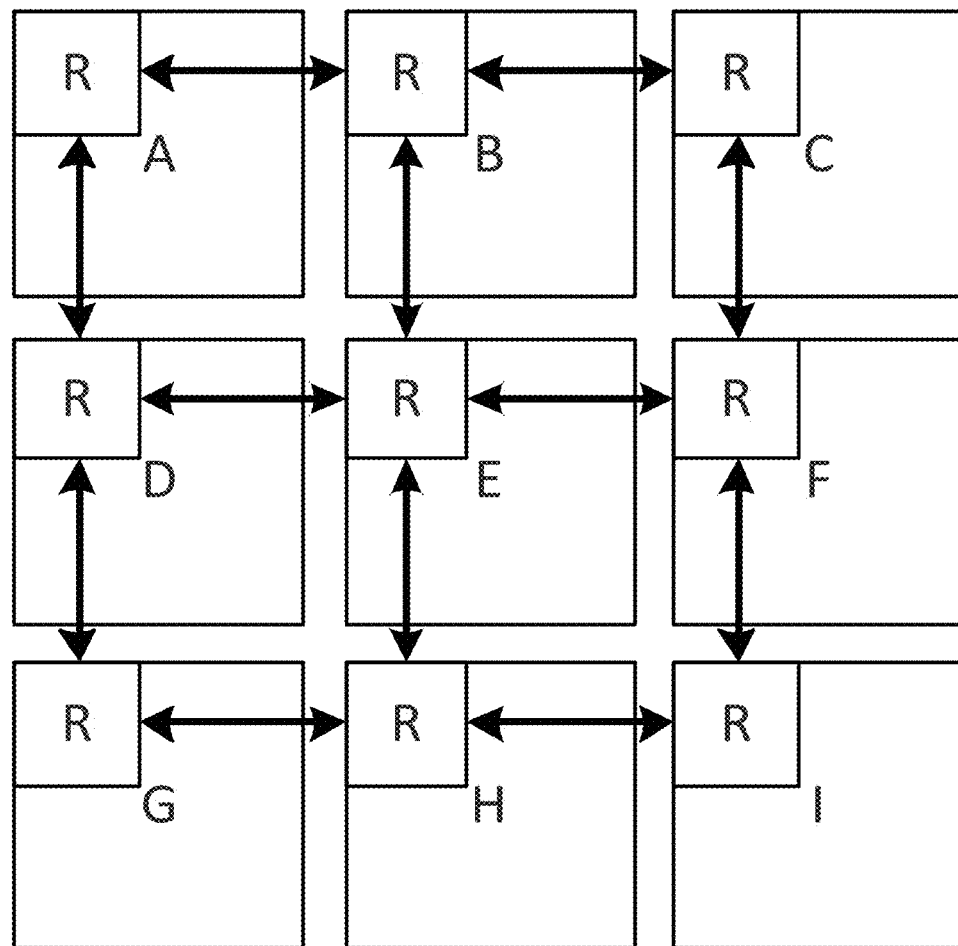
Figure 1C:
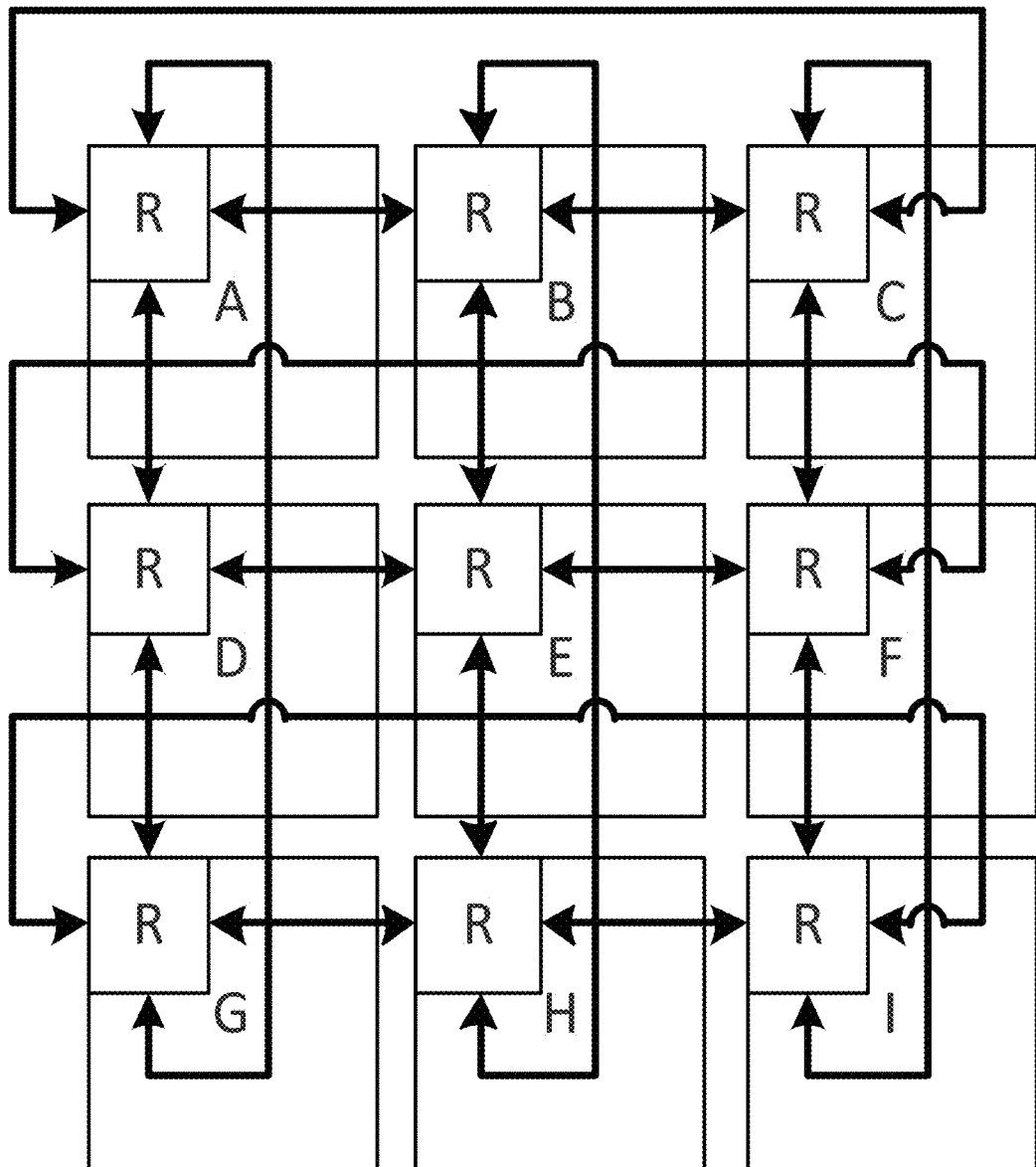
Figure 1D:
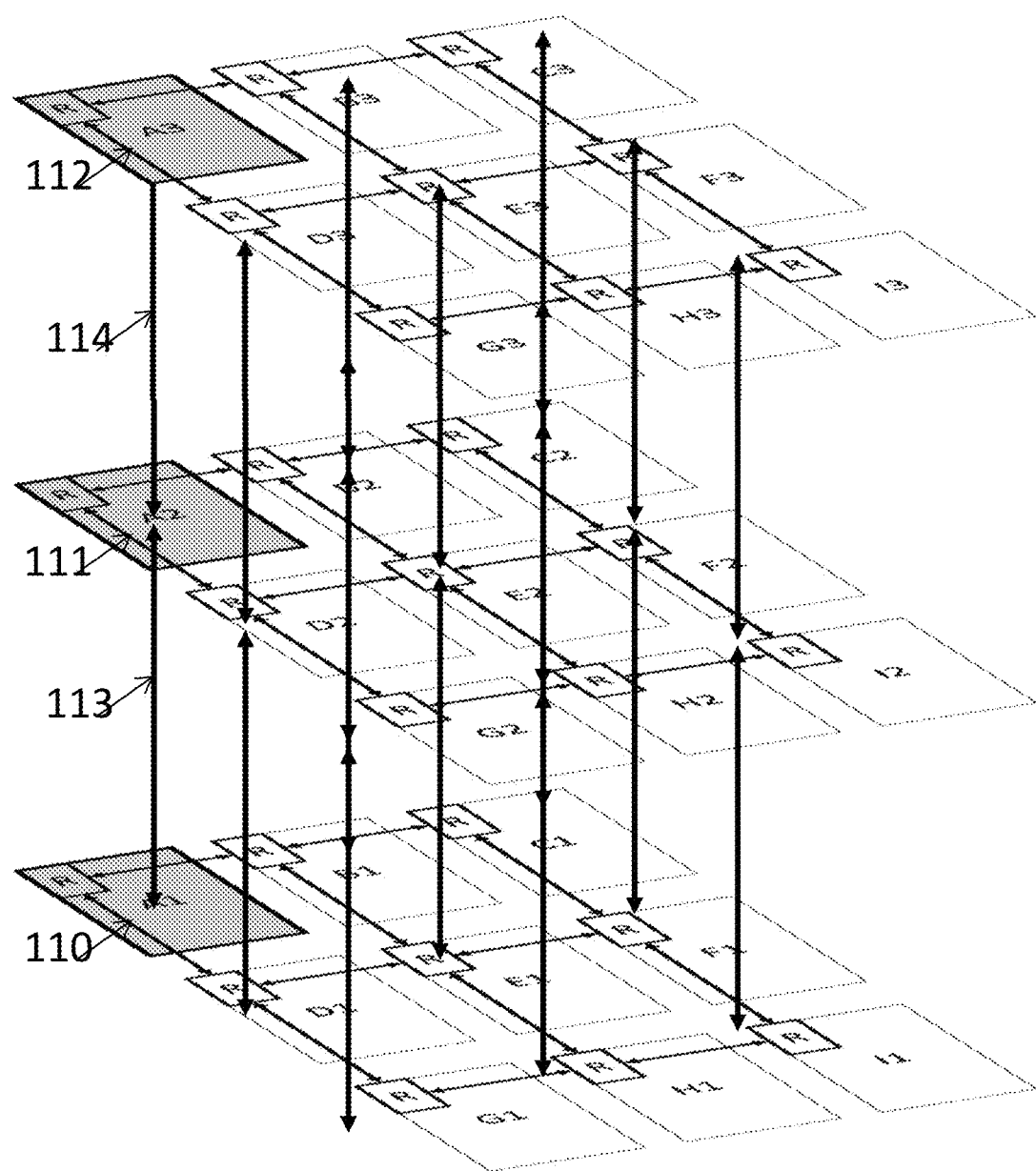
Figure 2A:
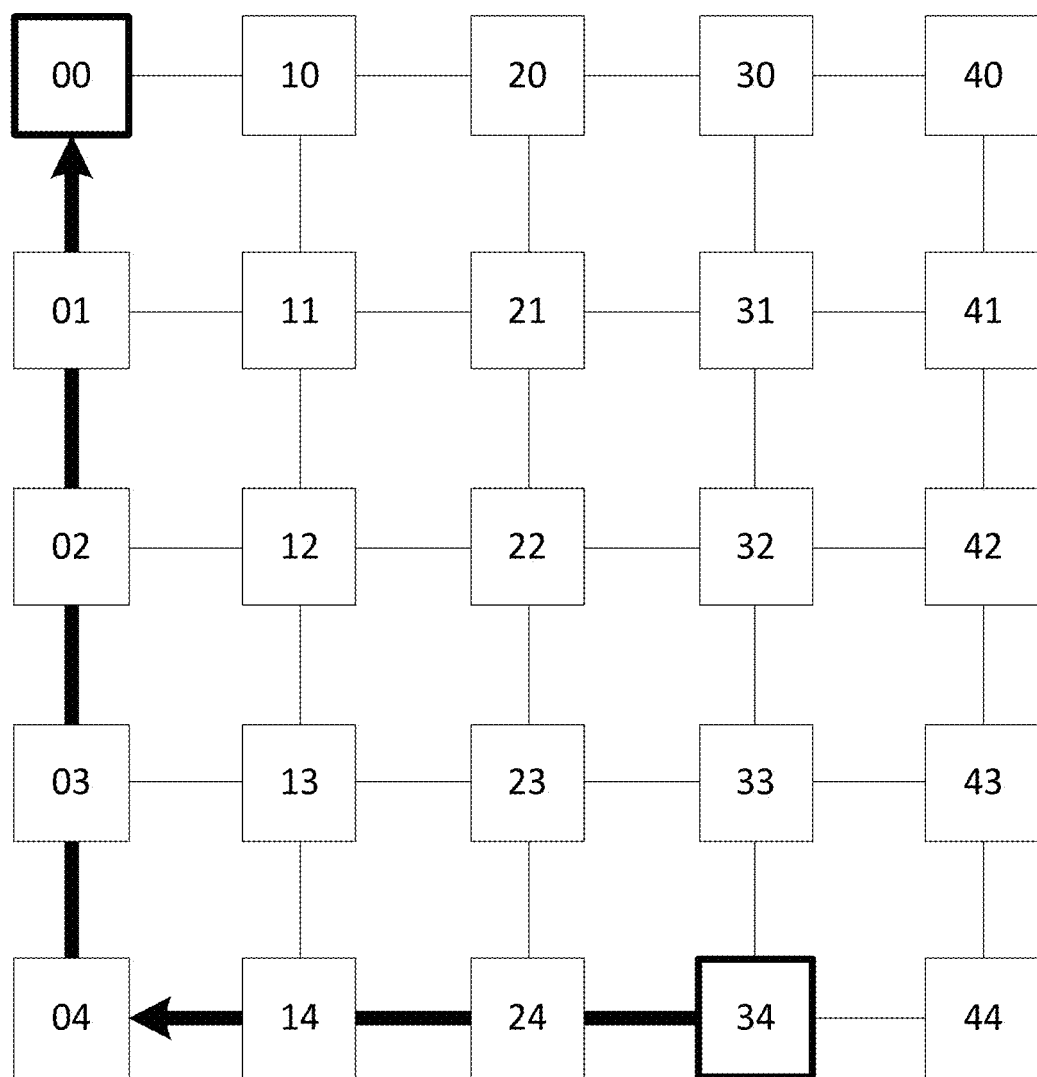
FIG. 2A illustrates an example of XY routing in a related art two dimensional mesh.
Figure 2B:
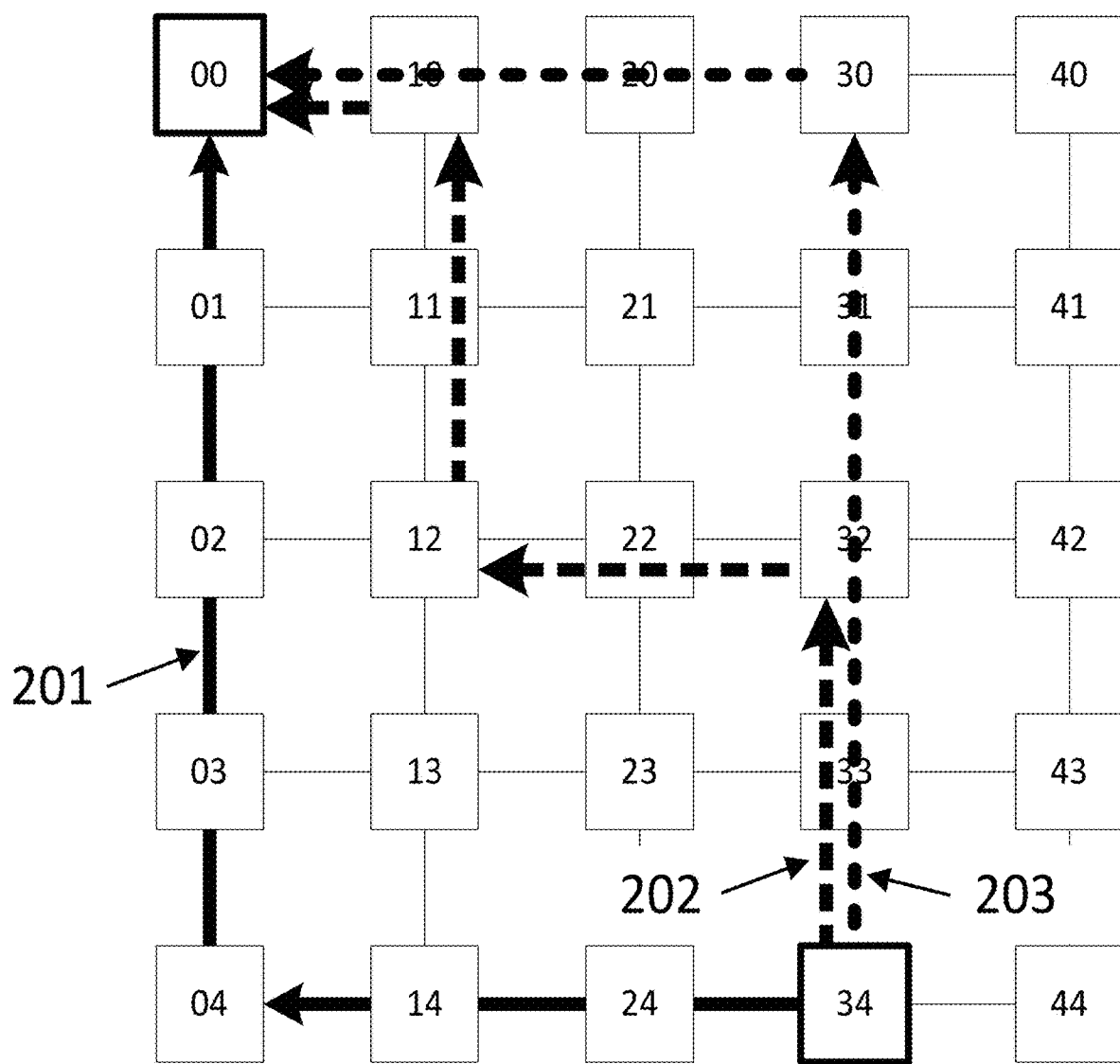
FIG. 2B illustrates three different routes between a source and destination nodes.
Figure 3A:
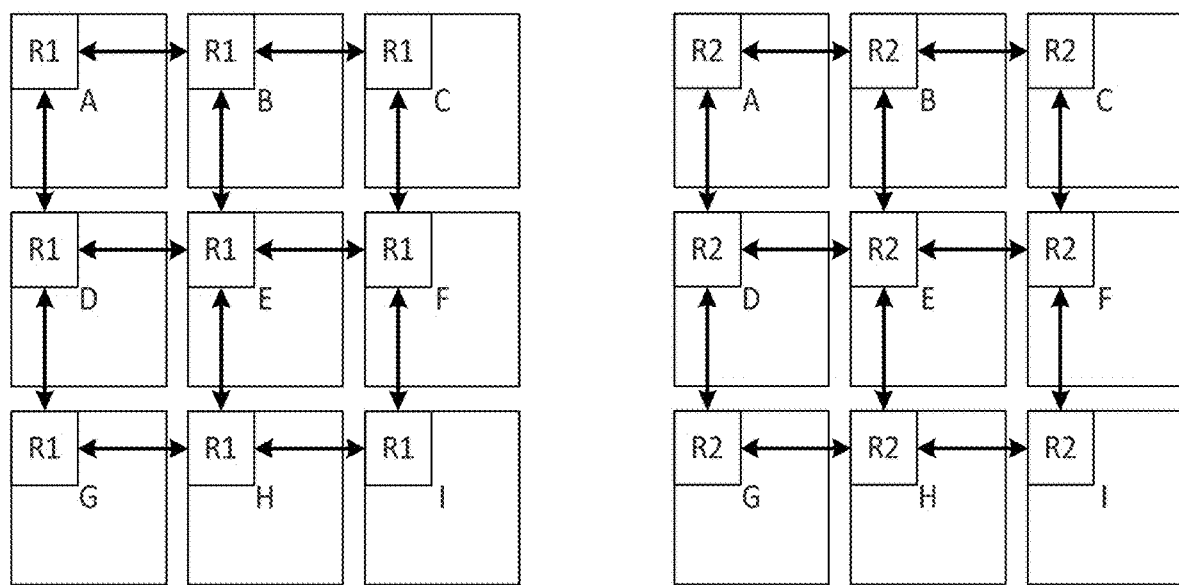
FIG. 3A illustrates an example of a related art two layer NoC interconnect.
Figure 3B:
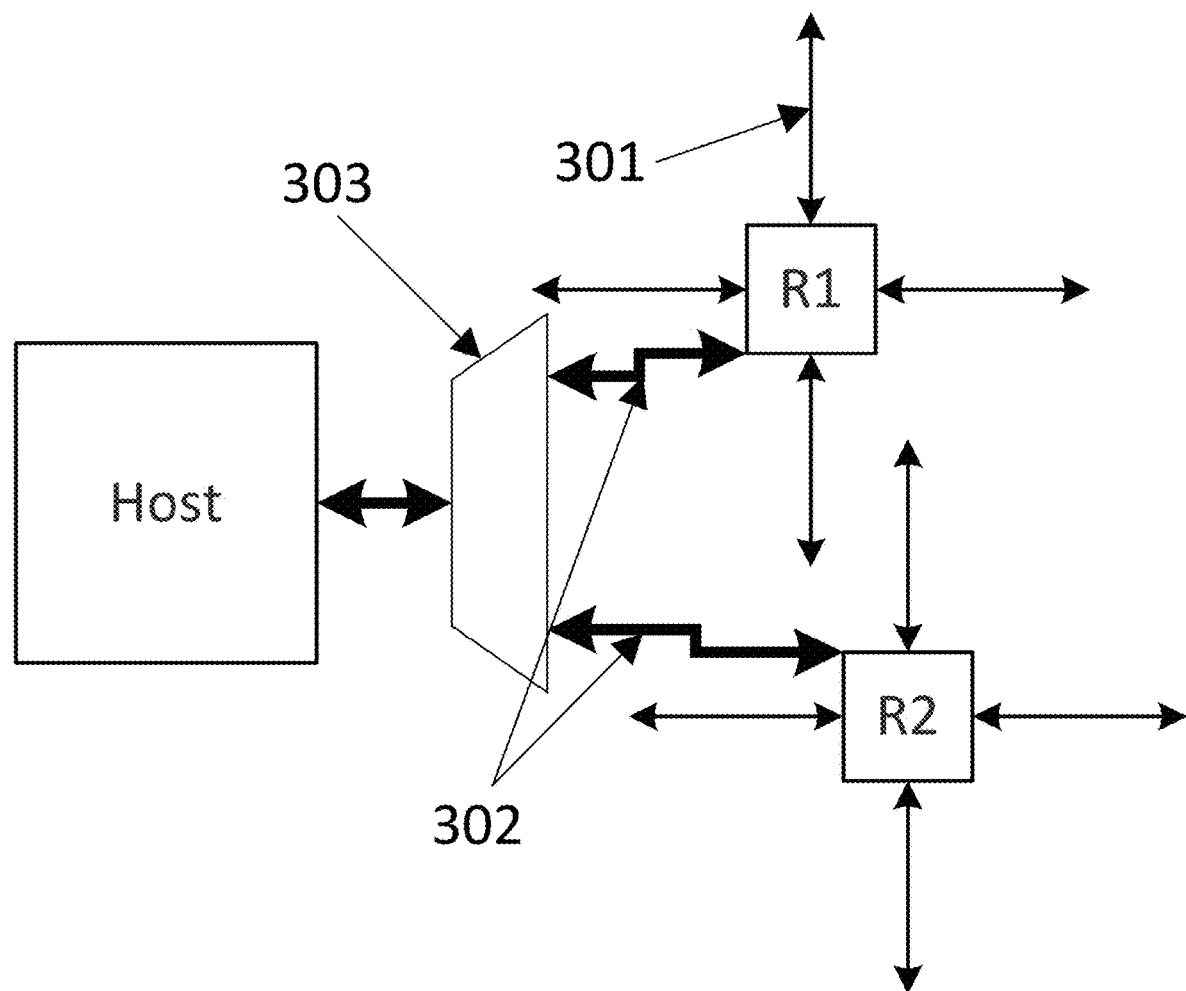
FIG. 3B illustrates the related art bridge logic between host and multiple NoC layers.

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to quality-of-service (QOS) enhancement pertaining to packet routing in Network-on-Chip (NoC) architectures, and more specifically, to implementation of a bandwidth weighting mechanism based NoC configuration/constructions for packet routing.

Aspects of the present disclosure relate to methods, systems, and computer readable mediums for packet routing in a circuit architecture, wherein, in an aspect, the proposed method includes the steps of managing, at a router of the circuit architecture, one or more catch-up bits, each of the one or more catch-up bits indicating that the router has reset a round of round-robin based packet routing without allowing an agent corresponding to said each of the one or more catch-up bits to complete its respective round; and allowing, by the router, the agent to continue its respective round in catch-up state such that upon completion of said respective round, the agent is switched to normal state.

In an aspect, when a respective router is ending a round, a first set of agents that are in end-of-round state return to said normal state, and a second set of agent that are in normal state are switched to catch-up state. In another aspect, arbiter of the respective router allocates highest priority to agents that form part of the catch-up state. In yet another aspect, each output port of the respective router can be configured as a 2-bit state machine. In another aspect, when the router transmits an end-of round signal back to agents in the catch-up state, the agents extend one or more requests to obtain permissions for catch-up round and subsequent new round.

In an aspect, the present disclosure further relates to a non-transitory computer readable medium storing instructions for executing a process for packet routing in a circuit architecture, the instructions comprising: managing, at a router of the circuit architecture, one or more catch-up bits, each of the one or more catch-up bits indicating that the router has reset a round of round-robin based packet routing without allowing an agent corresponding to the each of the one or more catch-up bits to complete its respective round; and allowing, by the router, the agent to continue its respective round in catch-up state such that upon completion of the respective round, the agent is switched to normal state.

In another aspect, the present disclosure relates to a system operatively coupled with a circuit architecture comprising: a catch-up bits management module configured to manage, at a router of the circuit architecture, one or more catch-up bits, said each of the one or more catch-up bits indicating that said router has reset a round of round-robin based packet routing without allowing an agent corresponding to said each of the one or more catch-up bits to complete its respective round; and a catch-up state based agent round execution module configured to allow, by said router, said agent to continue its respective round in catch-up state such that upon completion of said respective round, said agent is switched to normal state.

In an aspect, the present disclosure relates to a weighted round-robin technique where each router (R) contains an arbiter that tracks the rounds, and wherein the weight of each of agent is provided through early termination signaling from the agents. The routers and the source agents can thereby operate independently with respect to when their round is terminated, and the routers can manage the state of each source agent based on the early termination signaling received from the source agents. Sources utilize the early termination signaling to indicate to the routers when their round has completed. In an example implementation, the router is configured to move to the next round when all of the received requests are for a new round. In this manner, the router can still receive requests from a prior round from input sources that are still operating in the prior round, and then moves to the next round once all of the requests received are for the next round.

In another aspect, the present disclosure further relates to allocation of credits to one or more agents of the NoC such that one credit is used while making a request and no requests are possible after all the credits are consumed. A reset of the credits is done for an agent when an agent completes its round. Upon such completion, the credits (also referred to as credit counters) allocated to that agent are reset. Aspects of the present invention enable dynamic/programmable allocation of credits to one or more agents. Also, instead of routers keeping track of the credits, sources can be configured to keep track of the credits such that when the sources indicate the completion of the round, the allocation of credits to the source agents can be reset. Through such implementations, the length of a round can be determined for each source. The round is measured in the number of packets or requests, and a counter is used to check when all packets have been sent for a round and when the next round starts. Depending on the desired implementation, the counter does not have to be implemented in the agent, but can be implemented in the interface logic or bridge in the network to determine the rounds for the source on its behalf.

Figure 4:
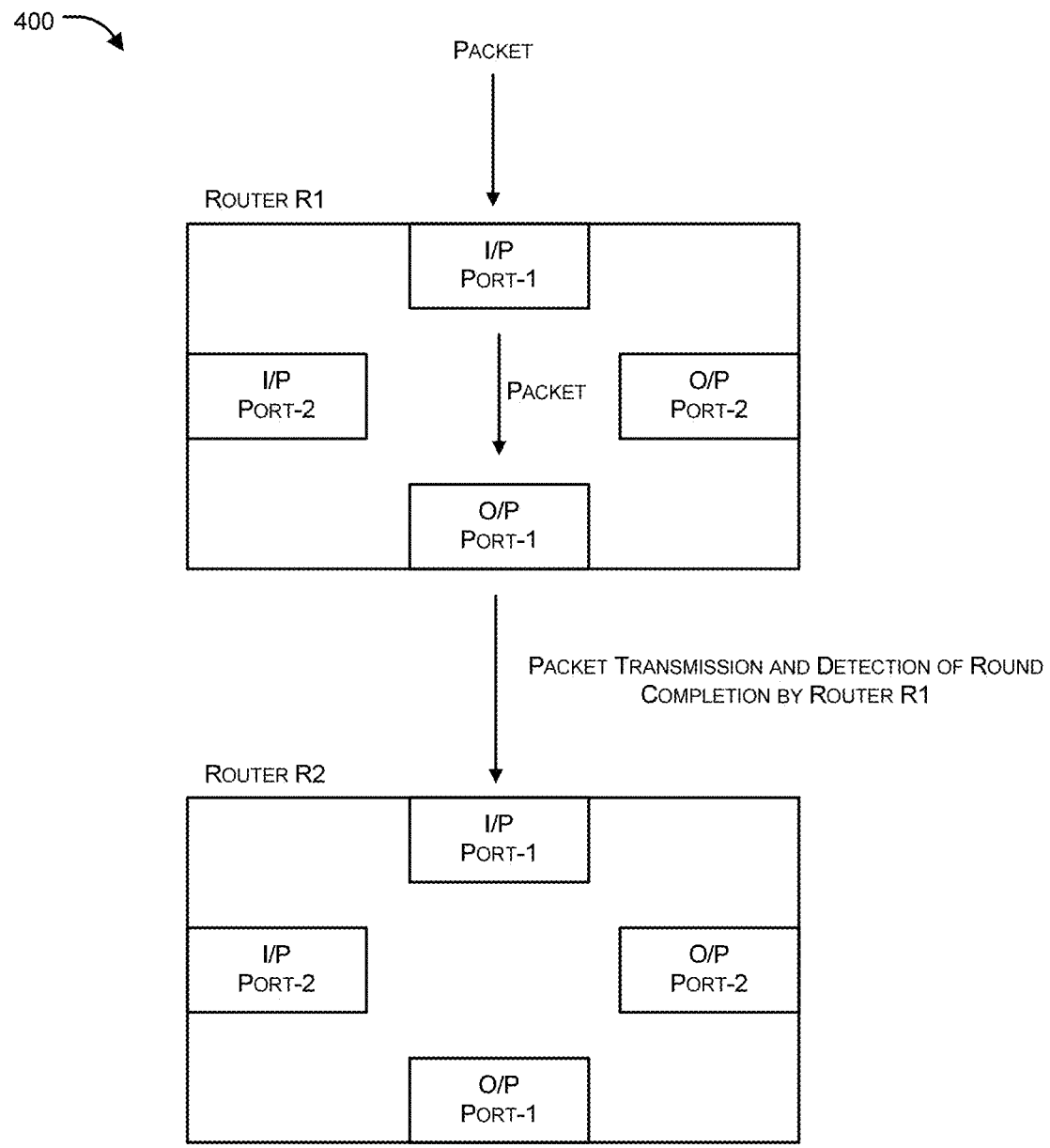
FIG. 4 illustrates an exemplary representation of a router that forms part of the present invention in accordance with example implementations.

Example implementations of the present disclosure also change the manner in which information packets are propagated, wherein instead of managing packet flow across the complete NoC network, flow can be managed/controlled point-to-point. For instance, each router can have its own concept of a round, and can therefore determine when the round is completed, and intimate such round completion signal to the next router. For instance, with reference to the system 400 of FIG. 4, in case Router R1 has two input ports 1 and 2 and two output ports 3 and 4, when rounds of the input ports 1 and 2 are completed (detected by the output (O/P) ports 3 and 4), say by receipt of a packet through input port (I/P) 1, the router R1 can detect that its round is completed, and accordingly intimate the next downstream router (say R2) while sending the packet through any (or both) of the output ports. However, the router does not need to wait for input ports 1 and 2 to be completed to switch rounds; depending on the desired implementation the router can be configured to switch rounds even if the input ports have not completed the rounds yet. The next/second round will then start for R1 when the second packet is received. Therefore, in the present invention, each of the ports (input and output) of a router are well aware, using the above-mechanism, when a round has ended, even if they were not actively involved in processing the packet processing that form part of the round.

Using the above example implementation, routers of the present invention can maintain a table indicating, for each source, whether the source is in the current round, ready for the next round, or has fallen behind by at least a round. As also mentioned above, after completion of each round, when the source finishes its round, the credits allocated to the sources are reset to the default value (say 8 bits).

Example implementations of the present disclosure further relate to weighted round-robin (WRR) with early termination, wherein the rounds are managed by the router, and the sources track weights for a particular round. The sources manage when a round is to end, and although the source may not know when a particular round ends within the router, the source can send an early termination signal to indicate to the router that the sources has finished its round. The router can use the signal to move to the next round if all current requests are ready to proceed to the next round based on determining the number of requests available for an existing round. In an instance, in case there are input ports to a router, each port being connected to an agent/node, wherein the 4 inputs ports respectively are allocated 8, 4, 2, and 1 credits such that in case the second input port/agent indicates that its 2 requests have ended through the use of 2 credits, it can send an early termination signal to the router to indicate that it has finished its respective round, and is ready for the next round whenever all the other inputs ports are.

Aspects of the present disclosure further incorporate a catch-up bit that enables an agent/node to indicate that it had not finished its previous round, and that the arbiter responsible for the agent has moved on, allowing the agent to work in the catch-up state and return back to normal state when its respective round is over, which allows the agent to use the credits from the pending round. In an instance, if there are 4 agents, one allocated 8 credits, one 4 credits, one 2 credits, and one 1 credit, and after completion of the 2 credits of the third agent, if the arbiter changes the round, at which time if the first agent has only used its 3 credits, the first agent can work in the catch-up state till its balance/pending/remaining 5 credits are used and then return back to the normal state.

Figure 5A:
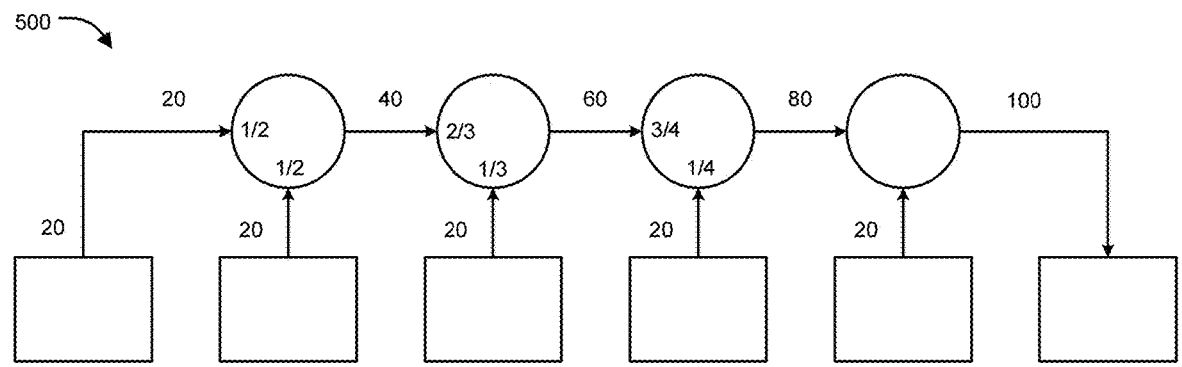
FIG. 5A illustrates an existing (prior art) weighted round robin implementation for packet routing.
Figure 5A:
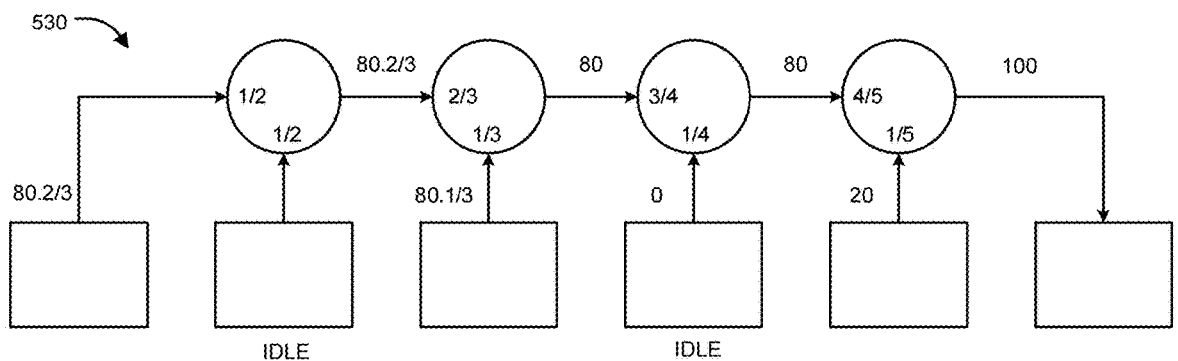

FIG. 5A illustrates existing (prior art) weighted round robin implementations for packet routing. FIG. 5A illustrates a scenario at 500 where weighted round robin is utilized (e.g., arbitration points are set at ½-½, ⅔-⅓, ¾-¼, etc.) and the resulting bandwidth distribution is used. In the representation 530, when some of the sources become idle, the distribution of bandwidth may become uneven/unfair as illustrated with some agents using a larger share of bandwidth than expected, which can also result in the original ratios of the weighted round robin not being preserved.

Figure 5B:
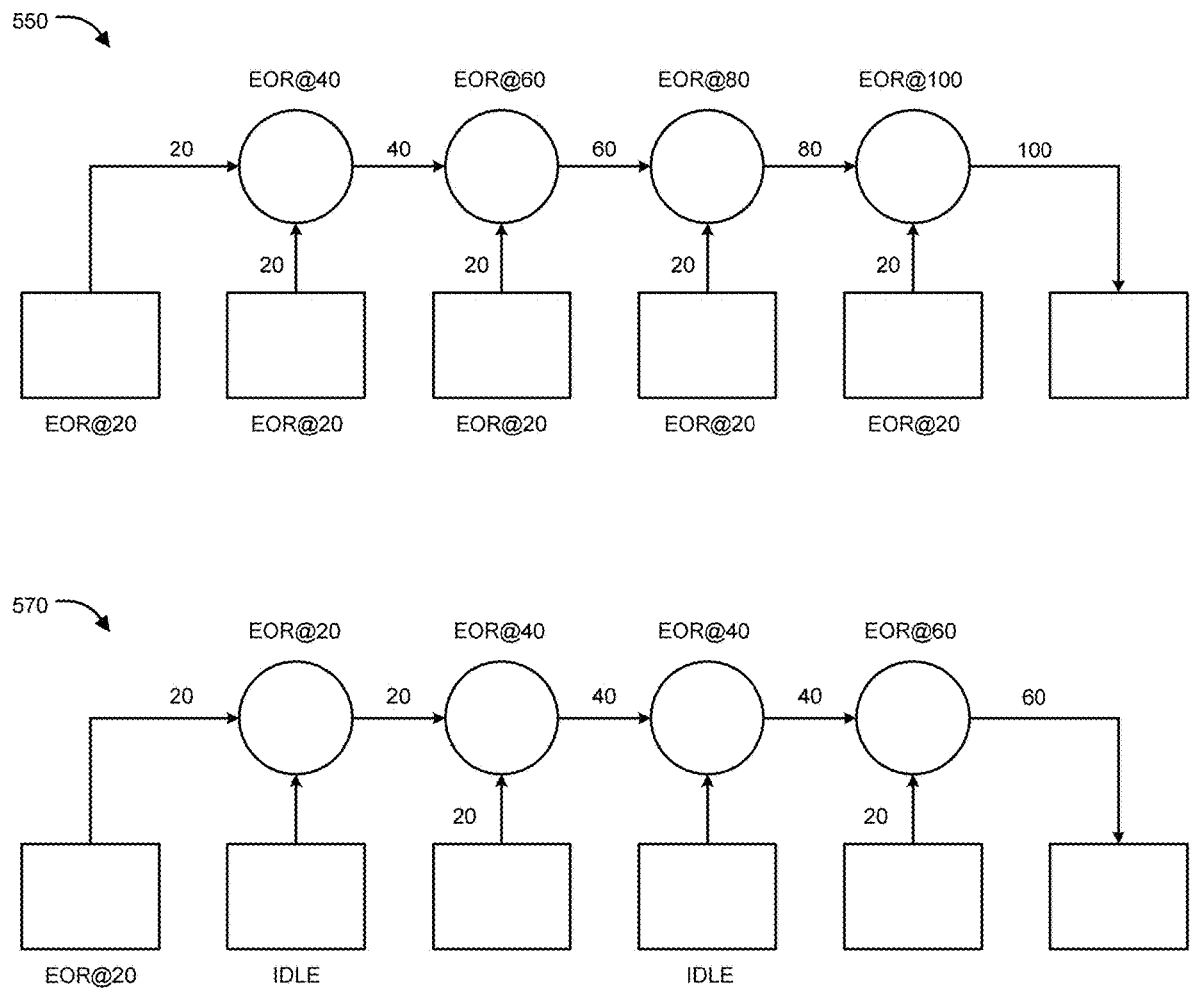
FIG. 5B illustrates an exemplary proposed weighted round robin implementation for packet routing.

FIG. 5B illustrates exemplary proposed weighted round robin implementations 530 for packet routing. In contrast to FIG. 5A, in the weighted round robin with early termination of the present invention, sources can send a signal to indicate an early termination of a round so that the router can be informed that the round ends for a particular source. In circumstances when some sources become idle, the router can thereby end a round for the associated sources without having to fill all of the bandwidth allocation available, and can simply proceed to the next round for the sources. For instance, as shown in representation 570, it can be seen that the round at the destination node ends after 60 credits, thereby preserving the initial ratios while also being work conserving.

Figure 7A:
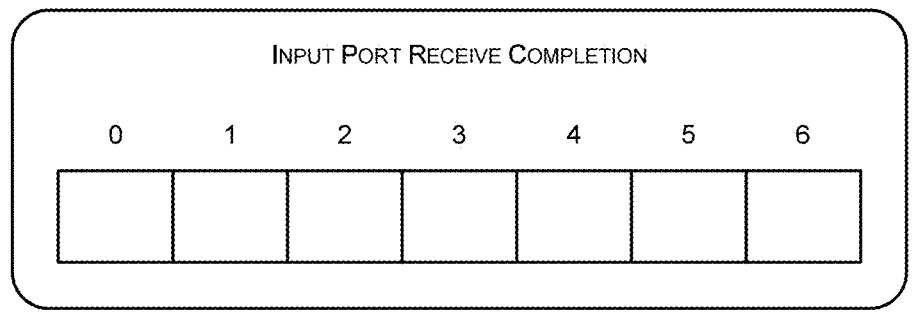
FIGS. 7A and 7B illustrate working of how weighted round-robin with early termination based packet routing and catch-up state based agent operation is performed in accordance in accordance with an example implementation.

In an example implementation, the proposed system can use packet processing based on programmable weights being assigned to nodes. Early completion allows a traffic flow to complete before the credits have expired. A simple extension of this is to allow an agent to get less bandwidth by signaling an early completion sooner. Therefore, if node M0 wanted less traffic, it can indicate early completion to R1 at a count of 10. If M0 indicates an early completion to R1 after 10, it will receive half the bandwidth of the other agents/nodes. It would be appreciated that it may not matter what the weights in the WRR credit are if each port is indicating early completion before the WRR runs out of credits for that port, and therefore if the allocated credits very large, say 1000, an early round completion will always control bandwidth. In such a case, WRR arbiters can be conceived as having infinity credits per port, wherein early termination can transition the count from infinity to zero until the WRR arbiter resets its round. Therefore, instead of implementing a credit counter, we can have a single state bit that indicates whether the request port can issue requests, or is out of credits. Or equivalently, did the input port receive a completion as shown in FIG. 7A as the output VC arbiter knows which port sent the completion. If the VC arbiter tracks which input ports receive a round completion indicator, it can select only among the requests that still have credits (those that haven't sent the completions). Eventually, the arbiter will finish its own round when it either sees that all credits are empty, or when all current requests have no credits. When this occurs, it will send a completion of its own to the next arbiter.

Figure 6A:
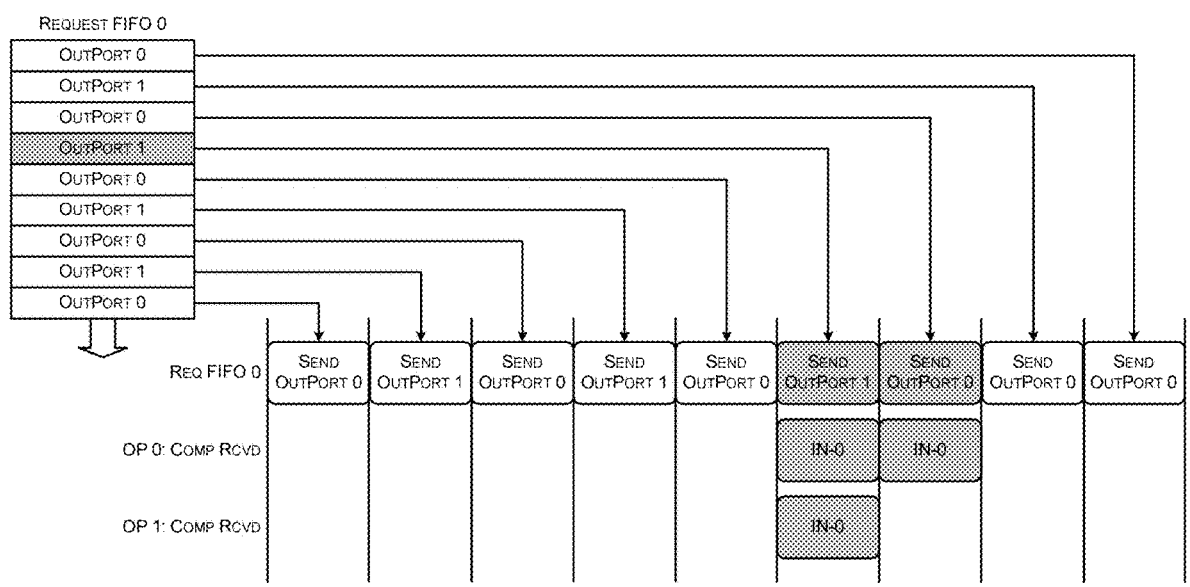
FIGS. 6A and 6B illustrate how weighted round-robin with early termination based packet routing is performed in accordance with example implementations.

FIG. 6A illustrates a single input port trying to access 2 output ports, wherein a single input port exists and has traffic to two different output ports. The request FIFO has a number of requests, including one that is marked with a completion flag (shown in hashed lines). The requests are sent on the output ports in order, as shown. When the early termination reaches the head of the queue, the first task is for each arbiter to drop this input ports credits to zero. Since there are two output ports, there are two arbiters, each with a separate set of "credit counters". Both will see the completion flag and update their state. This is shown in the "Comp Rcvd" rows of the cycle chart. In that same cycle, the Output Port 1 arbiter will see that the only available request has no credits available, and will instantly reset the round, granting the request and marking it with a completion flag. While the original request had a completion flag, this should not be construed as propagating that flag. In the next cycle, a request is made for Output Port 0. It is to be appreciated that the completion flag has already removed all credits for this requester in the Output Port 0 arbiter, and this is shown in the FIG. 6A with the "Comp Rcvd" indicator. In this cycle, once again the only request available has no credits. Therefore, the arbiter will reset the round, send a request to that port, and mark it with a completion flag. In this case, the original packet did not have the completion flag set. It is sent with a completion flag because that flag is generated by this arbiter. This means that traffic going down divergent paths will send early terminations in all of the required directions, allowing weights to be preserved even when paths diverge.

Figure 6B:
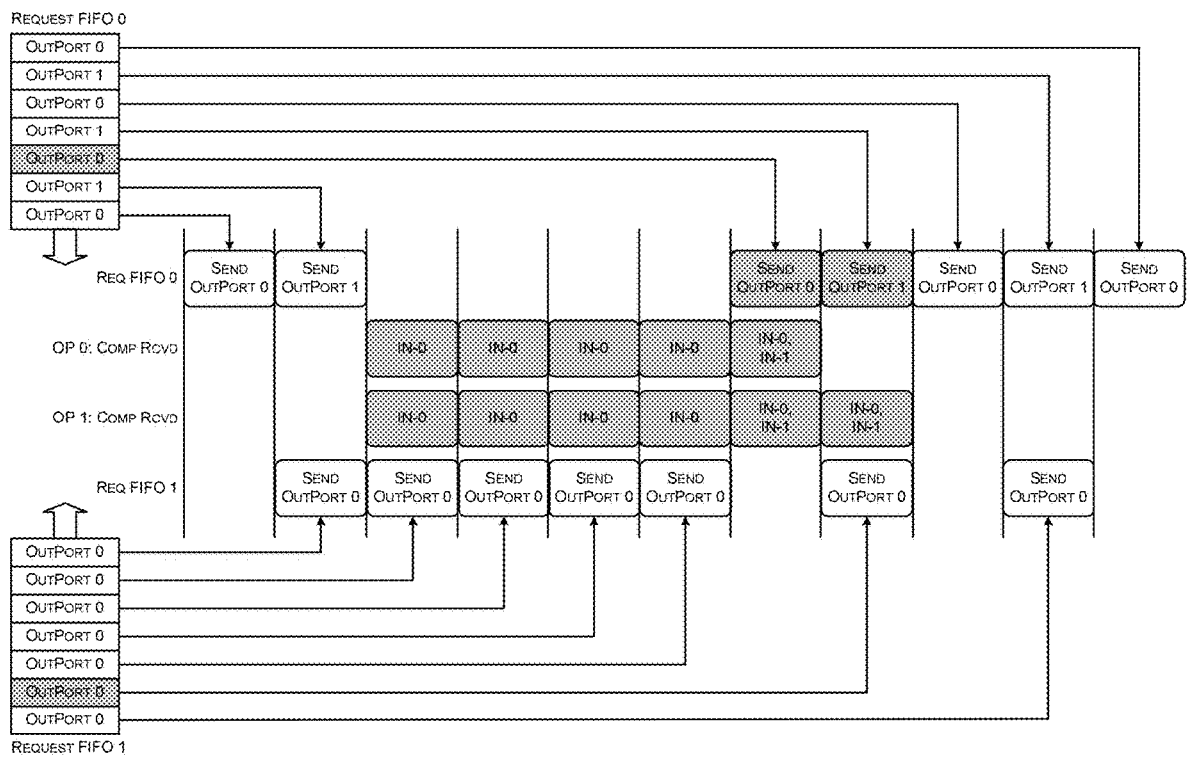

FIG. 6B illustrates another example showing 2 input ports trying to access 2 output ports, wherein both queues attempt to access Output Port 0 first, but Request FIFO 1 wins the grant, post which they alternate. However, Request FIFO 0 hits a completion flag quickly, and updates the output port arbiters with the appropriate indicator. For the next 4 cycles, Request FIFO 1 is able to send requests on Output Port 0. Eventually, it hits its own completion flag, and both output port arbiters see that no credits are available. However, since there are active requests for Output Port 0, that state machine is immediately reset and a request is selected. Using round-robin, Request FIFO 0 will win. The packet that gets sent will be marked with completion flag. In the next cycle, Output Port 1 will reset its own round because it has active requests with no available credits. This request also comes from Request FIFO 0, and will be marked with a completion flag even though it wasn't originally marked that way. Meanwhile, Request FIFO 1 will be able to send to Output Port 0. Since the round was reset in the prior cycle, no completion flag is sent. Note that this request was originally marked with a completion flag. Once again, that value is not propagated downstream. It would be appreciated that more complex scenarios work the same way. Each Output Port has an arbiter, and holds "credit" state for each of the input ports. The state machine resets when the only valid requests have no available credits, and on that cycle, a completion flag is sent.

Figure 7B:
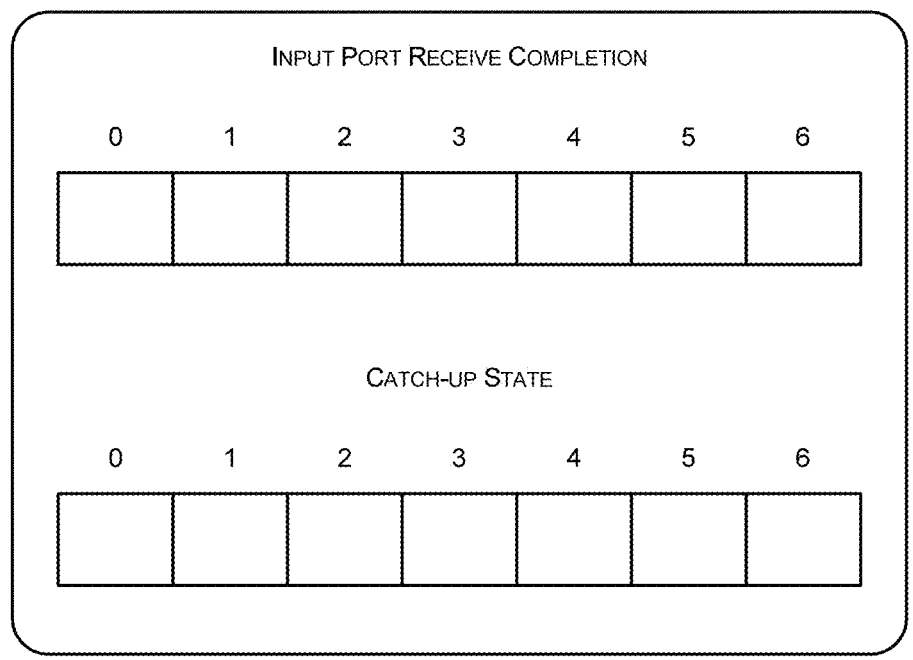

In an exemplary aspect of the present disclosure, if a mode transition happens while an interface is idle, the proposed system adds an extra state that allows the interrupted stream to potentially catch up. When a mode transition occurs and an interface is idle, a "Catch-up State" bit (as shown in FIG. 7B) can be set for that interface, which directs the interface to drop the first completion flag it receives. By dropping the first completion flag, that input stream has the potential to finish its current round, and then participate fully in the new round. Therefore, if a stream intended to be 20 long, and only sent 16 before the round reset, it can potentially catch up by sending 4, a completion flag that will be dropped, and the 20 more. If idle cycles are introduced on an interface for any reason, the bandwidth on that interface isn't halved. It is fully able to catch up and receive its full share of the bandwidth. To increase the potential for an interface to catch-up to the existing round, the arbitration can select interfaces in the catch-up state before interface that aren't in that state.

In an aspect, the present disclosure further enables bridges to associate a weight such that the associated weight gets propagated with the packet so as to get treated accordingly by one or more routers that process the said packet. That is, bridges may be configured to determine the weights instead of the agents, depending on the desired implementation.

Figure 8:
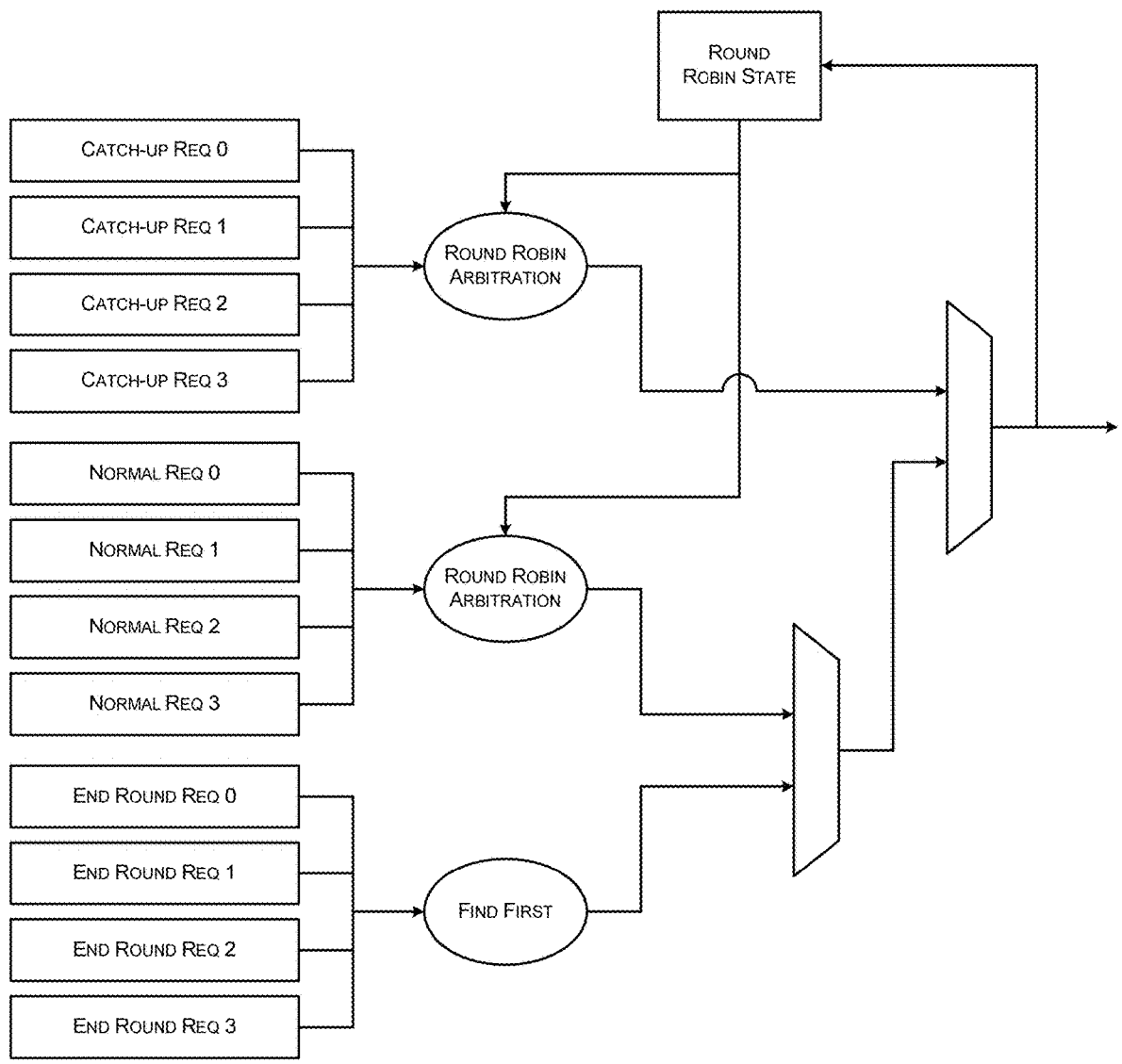
FIG. 8 illustrates how arbitration in various functional states is performed for NoC agent request processing in accordance with an example implementation.

FIG. 8 illustrates an exemplary architecture of the proposed implementation showing priority based arbitration based on state of agent that is operatively coupled through input ports of a router. When the agent is in a catch-up state, for instance, one or more requests (REQ0-REQ3, for instance) can be sent by the respective agent based on the credits remaining with the agent. In an aspect, the arbiter allocates highest priority to agents that form part of this state so as to allow them to complete their remaining credits and/or round and return back to the normal state. In the normal state, the agents arbitrate evenly with the other agents. When there are no normal state-based requests being sent i.e. no agents forming part of the normal state, end of round requests can be selected to send to the router, post which the normal round-robin process is followed.

Figure 9:
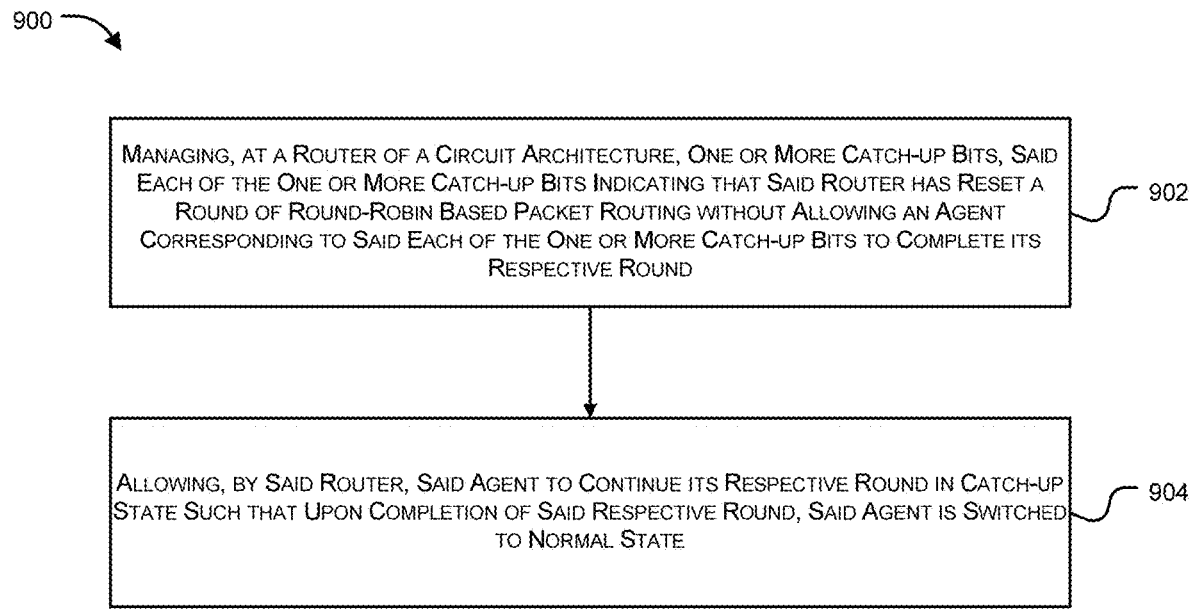
FIG. 9 illustrates an exemplary flow diagram using which example embodiments may be implemented.

FIG. 9 illustrates an exemplary flow diagram 900 using which example embodiments may be implemented. At step 902, the method includes the step of managing, at a router of the circuit architecture, one or more catch-up bits, each of the one or more catch-up bits indicating that the router has reset a round of round-robin based packet routing without allowing an agent corresponding to said each of the one or more catch-up bits to complete its respective round; and at step 904, the method includes the step of allowing, by the router, the agent to continue its respective round in catch-up state such that upon completion of the respective round, the agent is switched to normal state.

Figure 10:
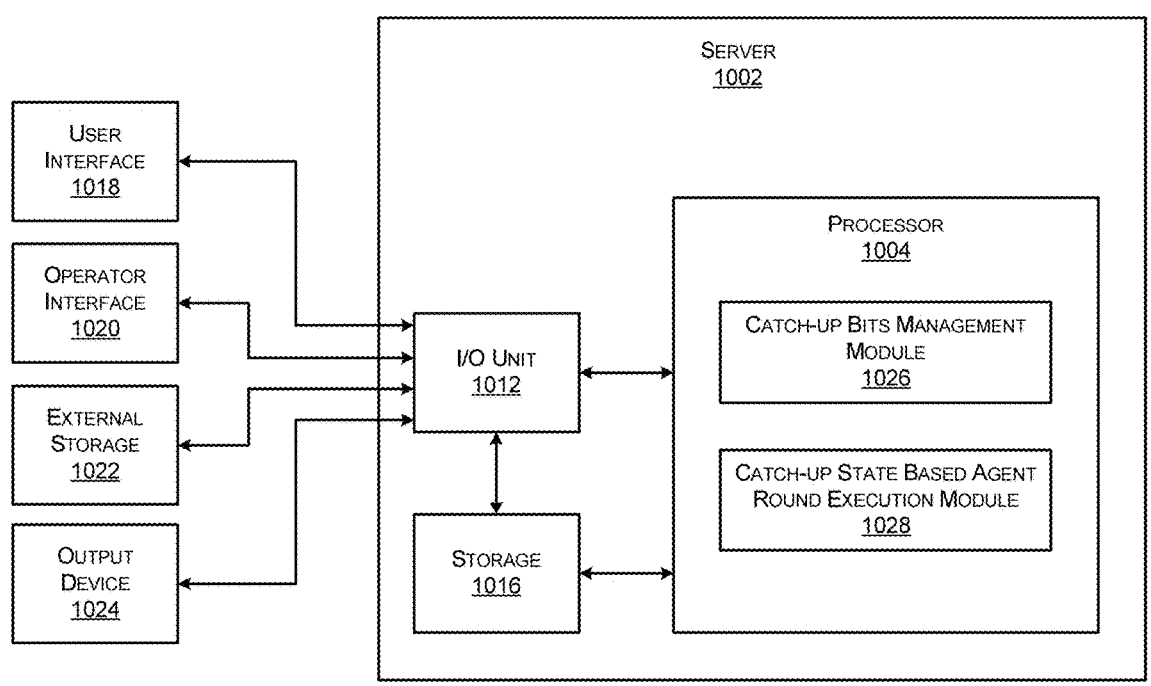
FIG. 10 illustrates an example computer system on which example embodiments may be implemented.

FIG. 10 illustrates an example computer system on which example embodiments may be implemented, specifically, for generation of a NoC/SoC with bridges, and routers configured with arbiters to execute the weighted round robin with early termination schemes as described herein. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 1000 includes a server 1002 that may involve an I/O unit 1012, storage 1016, and a processor 1004 operable to execute one or more units as known to one skilled in the art. The term "computer-readable medium" as used herein refers to any medium that participates in providing instructions to processor 1004 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1018 and operator interfaces 1020 which may utilize input devices such as a keyboard, mouse, touch device, or verbal command.

The server 1002 may also be connected to an external storage 1022, which can contain removable storage such as a portable hard drive, optical media (CD or DVD), disk media or any other medium from which a computer can read executable code. The server may also be connected an output device 1024, such as a display to output data and other information to a user, as well as request additional information from a user. The connections from the server 902 to the user interface 1018, the operator interface 1024, the external storage 1016, and the output device 1024 may via wireless protocols, such as the 802.11 standards, Bluetooth® or cellular protocols, or via physical transmission media, such as cables or fiber optics. The output device 1024 may therefore further act as an input device for interacting with a user.

The processor 1004 can include a catch-up bits management module 1026 configured to manage, at a router of the circuit architecture, one or more catch-up bits, each of the one or more catch-up bits indicating that the router has reset a round of round-robin based packet routing without allowing an agent corresponding to said each of the one or more catch-up bits to complete its respective round. The processor 1004 can further include a catch-up state based agent round execution module 1028 configured to allow, by the router, the agent to continue its respective round in catch-up state such that upon completion of the respective round, the agent is switched to normal state. Such modules are utilized to configure and generate the NoC with the functionality as described above.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

The invention claimed is:

1. A circuit architecture, comprising:
one or more routers configured as arbitration points for one or more agents, the one or more routers configured to implement a weighted round-robin arbitration scheme with an early termination circuitry, the early termination circuitry configured to receive an early termination message from an input source and determine an end of a round from the early termination message.

2. The circuit architecture of claim 1, wherein the circuit architecture is implemented as a distributed non-tree network where completion of a round at one of the arbitration points is indicated to the other ones of the arbitration points.

3. The circuit architecture of claim 1, wherein the one or more agents are configured to manage weights of the weighted round-robin arbitration scheme of the one or more routers, and are configured to communicate when the round ends to the arbitration points, wherein the circuit architecture is programmable to configure the weights for each of the one or more agents.

4. The circuit architecture of claim 3, wherein the one or more routers are configured to rely on the early termination signals of the sources to determine when a round has ended, and do not manage weights of the one or more sources.

5. The circuit architecture of claim 1, wherein each of the one or more routers are configured to: track which round each of the one or more agents are operating; for a completion of a round: determine ones of the one or more agents move to a next round and other ones the one or more agents that remain in the round; for the other ones of the one or more agents that remain in the round: allow the other ones of the one or more agents to complete requests; transition the other ones of the one or more agents to the next round; and allocate resources to the other ones of the one more agents for the next round to include remaining resources allocated from the round.

6. The circuit architecture of claim 5, wherein the one or more routers are configured to selectively allow the other ones of the one or more agents to complete requests before processing of requests from the ones of the one or more agents transitioned to the next round.

7. A Network on Chip (NoC) configured with a distributed arbitration system, comprising: one or more routers configured as arbitration points for one or more agents, the one or more routers configured to implement a weighted round-robin arbitration scheme with an early termination circuitry, the early termination circuitry configured to receive an early termination message from a source agent from the one or more agents and determine an end of a round from the early termination message; wherein each of the one or more routers are configured to transmit signals to other ones of the one or more routers indicative of round completion of the each of the one or more routers.

8. The NoC of claim 7, wherein the NoC is implemented as a distributed non-tree network where completion of a round at one of the arbitration points is fanned out to the other ones of the arbitration points.

9. The NoC of claim 7, wherein the one or more agents are configured to manage weights of the weighted round-robin arbitration scheme of the one or more routers, and are configured to communicate when the round ends to the arbitration points, wherein the circuit architecture is programmable to configure the weights for each of the one or more agents.

10. The NoC of claim 9, wherein the one or more routers are configured to rely on the early termination signals of the sources to determine when a round has ended, and do not manage weights of the one or more sources.

11. The NoC of claim 7, wherein each of the one or more routers are configured to: track which round each of the one or more agents are operating; for a completion of a round: determine ones of the one or more agents move to a next round and other ones the one or more agents that remain in the round; for the other ones of the one or more agents that remain in the round: allow the other ones of the one or more agents to complete requests; transition the other ones of the one or more agents to the next round; and allocate resources to the other ones of the one more agents for the next round to include remaining resources allocated from the round.

12. The NoC of claim 11, wherein the one or more routers are configured to selectively allow the other ones of the one or more agents to complete requests before processing of requests from the ones of the one or more agents transitioned to the next round.

* * * * *